US012361917B2

(12) United States Patent
Bradley et al.

(10) Patent No.: US 12,361,917 B2
(45) Date of Patent: Jul. 15, 2025

(54) ENHANCED SYSTEM, METHOD, AND DEVICES FOR CAPTURING INAUDIBLE TONES ASSOCIATED WITH CONTENT

(71) Applicant: Datavault AI Inc., Beaverton, OR (US)

(72) Inventors: Nathaniel T. Bradley, Tucson, AZ (US); Joshua S. Paugh, Tucson, AZ (US); Enrique C. Feldman, Tucson, AZ (US)

(73) Assignee: DATAVAULT AI INC., Beaverton, OR (US)

( * ) Notice: Subject to any disclaimer, the term of this patent is extended or adjusted under 35 U.S.C. 154(b) by 171 days.

(21) Appl. No.: 17/101,807

(22) Filed: Nov. 23, 2020

(65) Prior Publication Data

US 2021/0082380 A1 Mar. 18, 2021

Related U.S. Application Data

(63) Continuation of application No. 16/506,670, filed on Jul. 9, 2019, now Pat. No. 10,878,788, which is a (Continued)

(51) Int. Cl.
*G10H 1/00* (2006.01)
*G10H 1/40* (2006.01)

(52) U.S. Cl.
CPC ............. *G10H 1/0008* (2013.01); *G10H 1/40* (2013.01); *G10H 2210/066* (2013.01); (Continued)

(58) Field of Classification Search
CPC ........... G10H 1/0008; G10H 2240/091; G10H 1/0066; G10H 2210/091; G10H 2220/015; G10H 1/0058; G10H 2220/005; G10H 2220/091; G10H 2220/011; G10H 2240/131; G10H 1/0575; G10H 1/0083; G10H 2210/005; G10H 2210/086; G10H 2240/026; G10H 2240/081; G10H 2240/115; G10H 2250/481; G10H 3/125; G10H 2240/311; G10H 1/40;
(Continued)

(56) References Cited

U.S. PATENT DOCUMENTS 4,399,731 A 8/1983 Aoki
4,479,416 A 10/1984 Clague
(Continued)

FOREIGN PATENT DOCUMENTS

AU 4899597 A * 11/1998
CH 694652 A5 * 5/2005 ............. H04H 20/31
(Continued)

*Primary Examiner* — Christina M Schreiber
(74) *Attorney, Agent, or Firm* — Goodhue, Coleman & Owens, P.C.

(57) ABSTRACT

One embodiment provides a system, method, and device for capturing inaudible tones from content. Content is received. Inaudible tones in the content are detected. Information associated with the inaudible tones of the content is extracted. Information associated with the inaudible tones is communicated to one or more devices. One or more actions associated with the information extracted from the inaudible tones is automatically implemented utilizing the one or more devices.

20 Claims, 7 Drawing Sheets

Related U.S. Application Data continuation of application No. 16/019,257, filed on Jun. 26, 2018, now Pat. No. 10,460,709.

(60) Provisional application No. 62/524,835, filed on Jun. 26, 2017.

(52) U.S. Cl.
CPC . *G10H 2220/005* (2013.01); *G10H 2220/121* (2013.01); *G10H 2240/091* (2013.01); *G10H 2240/325* (2013.01)

(58) Field of Classification Search
CPC ....... G10H 2210/066; G10H 2220/121; G10H 2240/325
USPC .......................................................... 84/609
See application file for complete search history.

(56) References Cited

U.S. PATENT DOCUMENTS

| | | | |
|---|---|---|---|
| 4,694,723 | A | 9/1987 | Shinohara et al. |
| 4,976,182 | A | 12/1990 | Obuchi et al. |
| 5,275,082 | A | 1/1994 | Kestner-Clifton et al. |
| 5,315,911 | A | 5/1994 | Ochi |
| 5,413,486 | A | 5/1995 | Burrows et al. |
| 5,533,903 | A | 7/1996 | Kennedy |
| 5,563,358 | A | 10/1996 | Zimmerman |
| 5,612,943 | A * | 3/1997 | Moses .............. G11B 20/10527 360/32 |
| 5,621,538 | A | 4/1997 | Gnant et al. |
| 5,690,496 | A | 11/1997 | Kennedy |
| 5,728,960 | A | 3/1998 | Sitrick |
| 5,746,605 | A | 5/1998 | Kennedy |
| 5,760,323 | A | 6/1998 | Romero et al. |
| 5,768,127 | A | 6/1998 | Murata |
| 5,773,741 | A | 6/1998 | Eller et al. |
| 5,931,680 | A | 8/1999 | Semba |
| 6,072,113 | A | 6/2000 | Tohgi et al. |
| 6,084,168 | A | 7/2000 | Sitrick |
| 6,096,962 | A | 8/2000 | Crowley |
| 6,156,964 | A | 12/2000 | Sahai et al. |
| 6,211,451 | B1 | 4/2001 | Tohgi et al. |
| 6,235,979 | B1 | 5/2001 | Yanase |
| 6,275,222 | B1 | 8/2001 | Desain |
| 6,348,648 | B1 | 2/2002 | Connick |
| 6,380,471 | B2 | 4/2002 | Matsumoto |
| 6,380,474 | B2 | 4/2002 | Taruguchi et al. |
| 6,392,132 | B2 | 5/2002 | Uehara |
| 6,483,019 | B1 | 11/2002 | Hamilton |
| 6,486,388 | B2 | 11/2002 | Akahori |
| 6,504,089 | B1 | 1/2003 | Nagasawa et al. |
| 6,515,210 | B2 | 2/2003 | Shibukawa |
| 6,545,208 | B2 | 4/2003 | Hiratsuka |
| 6,555,737 | B2 | 4/2003 | Miyaki et al. |
| 6,664,458 | B2 | 12/2003 | Hiratsuka et al. |
| 6,674,861 | B1 | 1/2004 | Xu et al. |
| 6,685,480 | B2 | 2/2004 | Nishimoto et al. |
| 6,686,531 | B1 | 2/2004 | Pennock et al. |
| 6,727,418 | B2 | 4/2004 | Matsumoto |
| 6,777,607 | B2 | 8/2004 | Smith |
| 6,798,427 | B1 | 9/2004 | Suzuki et al. |
| 6,809,246 | B2 | 10/2004 | Errico |
| 6,831,220 | B2 | 12/2004 | Varme |
| 7,019,204 | B2 | 3/2006 | Terada |
| 7,030,307 | B2 | 4/2006 | Wedel |
| 7,041,888 | B2 | 5/2006 | Masuda |
| 7,041,890 | B1 | 5/2006 | Sutton |
| 7,045,698 | B2 | 5/2006 | Miyamoto |
| 7,064,261 | B2 | 6/2006 | Shao |
| 7,078,609 | B2 | 7/2006 | Georges |
| 7,094,960 | B2 | 8/2006 | Ikeya et al. |
| 7,094,962 | B2 | 8/2006 | Kayama |
| 7,105,733 | B2 | 9/2006 | Jarrett et al. |
| 7,119,266 | B1 | 10/2006 | Bittner et al. |
| 7,129,407 | B2 | 10/2006 | Hiratsuka et al. |
| 7,183,476 | B2 | 2/2007 | Swingle et al. |
| 7,199,298 | B2 | 4/2007 | Funaki |
| 7,199,299 | B2 | 4/2007 | Asakura |
| 7,223,912 | B2 | 5/2007 | Nishimoto et al. |
| 7,297,856 | B2 | 11/2007 | Sitrick |
| 7,314,992 | B2 | 1/2008 | Funaki et al. |
| 7,314,994 | B2 | 1/2008 | Hull et al. |
| 7,335,833 | B2 | 2/2008 | Smith et al. |
| 7,342,165 | B2 | 3/2008 | Gotfried |
| 7,371,954 | B2 | 5/2008 | Masuda et al. |
| 7,428,534 | B2 | 9/2008 | Ito et al. |
| 7,439,441 | B2 | 10/2008 | Jarrett et al. |
| 7,482,529 | B1 | 1/2009 | Flamini et al. |
| 7,485,794 | B2 | 2/2009 | Koizumi |
| 7,507,893 | B2 | 3/2009 | Knudsen |
| 7,560,635 | B2 | 7/2009 | Funaki |
| 7,589,271 | B2 | 9/2009 | Jarrett et al. |
| 7,589,727 | B2 | 9/2009 | Haeker |
| 7,601,905 | B2 | 10/2009 | Yanase et al. |
| 7,605,322 | B2 | 10/2009 | Nakamura |
| 7,640,501 | B2 | 12/2009 | Suzuki et al. |
| 7,642,447 | B2 | 1/2010 | Kojima |
| 7,683,250 | B2 | 3/2010 | Ikeya et al. |
| 7,703,014 | B2 | 4/2010 | Funaki |
| 7,765,314 | B2 | 7/2010 | Okamoto |
| 7,767,898 | B2 | 8/2010 | Nakayama et al. |
| 7,829,777 | B2 | 11/2010 | Kyuma et al. |
| 8,106,282 | B2 | 1/2012 | Lee |
| 8,138,409 | B2 | 3/2012 | Brennan |
| 8,158,874 | B1 | 4/2012 | Kenney |
| 8,319,083 | B2 | 11/2012 | Adams |
| 8,367,921 | B2 | 2/2013 | Evans et al. |
| 8,451,086 | B2 | 5/2013 | Petrovic et al. |
| 8,497,416 | B2 | 7/2013 | Gregson |
| 8,513,511 | B2 | 8/2013 | Ikeya et al. |
| 8,629,342 | B2 | 1/2014 | Lee et al. |
| 8,642,871 | B2 | 2/2014 | Feidner |
| 8,660,678 | B1 | 2/2014 | Lavi et al. |
| 8,680,388 | B2 | 3/2014 | Becker et al. |
| 8,688,250 | B2 | 4/2014 | Iwase et al. |
| 8,785,757 | B2 | 7/2014 | Pillhofer et al. |
| 8,878,040 | B2 | 11/2014 | Araki et al. |
| 9,006,551 | B2 | 4/2015 | Iwase et al. |
| 9,029,676 | B2 | 5/2015 | Iwase et al. |
| 9,035,162 | B2 | 5/2015 | Hamilton et al. |
| 9,082,380 | B1 | 7/2015 | Hamilton et al. |
| 9,092,992 | B2 | 7/2015 | Yung |
| 9,093,055 | B2 | 7/2015 | Daisy-Cavaleri |
| 9,105,259 | B2 | 8/2015 | Akazawa et al. |
| 9,116,509 | B2 | 8/2015 | Takahashi et al. |
| 9,120,016 | B2 | 9/2015 | Epstein |
| 9,183,754 | B2 | 11/2015 | Tanaka |
| 9,275,616 | B2 | 3/2016 | Uemura et al. |
| 9,333,418 | B2 | 5/2016 | Lee et al. |
| 9,412,352 | B2 | 8/2016 | Uemura |
| 9,418,638 | B2 | 8/2016 | Soejima |
| 9,424,822 | B2 | 8/2016 | Bisnauth |
| 9,472,178 | B2 | 10/2016 | Kruge |
| 9,545,578 | B2 | 1/2017 | Nathan et al. |
| 9,576,564 | B2 | 2/2017 | Yamauchi et al. |
| 9,601,029 | B2 | 3/2017 | Gebauer |
| 9,601,127 | B2 | 3/2017 | Yang et al. |
| 9,620,095 | B1 | 4/2017 | Hamilton et al. |
| 9,640,160 | B2 | 5/2017 | Wang et al. |
| 10,460,709 | B2 | 10/2019 | Bradley et al. |
| 10,878,788 | B2 | 12/2020 | Bradley et al. |
| 10,909,566 | B2 * | 2/2021 | Webster .................... G06F 9/44 |
| 10,917,693 | B2 | 2/2021 | Webster |
| 11,030,983 | B2 * | 6/2021 | Bradley ................... G10H 1/40 |
| 11,195,362 | B2 * | 12/2021 | Bradley ................... G07C 9/30 |
| 11,483,620 | B2 | 10/2022 | Webster |
| 2002/0002464 | A1 | 1/2002 | Petrushin |
| 2002/0100052 | A1 * | 7/2002 | Daniels ................ H04N 21/812 348/E7.063 |
| 2004/0003707 | A1 | 1/2004 | Mazzoni |
| 2004/0267387 | A1 * | 12/2004 | Samadani ............ G11B 27/034 |
| 2005/0257666 | A1 | 11/2005 | Sakurada |

(56) References Cited

U.S. PATENT DOCUMENTS

2006/0281403 A1* 12/2006 Richards .................. H04R 3/04 455/3.06
2007/0118544 A1 5/2007 Lundquist et al.
2008/0304653 A1* 12/2008 Ghani ..................... H04M 9/08 379/406.08
2010/0324992 A1* 12/2010 Birch ................. H04N 21/4722 725/32
2011/0068898 A1* 3/2011 Petrovic .................... G06F 7/00 340/5.86
2012/0084131 A1 4/2012 Bergel et al.
2012/0197648 A1* 8/2012 Moloney ............... G10L 19/018 381/56
2013/0102241 A1 4/2013 Devine et al.
2014/0056172 A1 2/2014 Lee et al.
2014/0180675 A1 6/2014 Neuhauser et al.
2014/0343703 A1* 11/2014 Topchy ............ G11B 20/00086 700/94
2015/0039320 A1 2/2015 Neuhauser et al.
2015/0039496 A1 2/2015 Shuster
2015/0046953 A1* 2/2015 Davidson ......... H04N 21/44008 725/74
2015/0221316 A1* 8/2015 Mufti .................... G10L 19/018 700/94
2016/0104190 A1 4/2016 Webster et al.
2017/0025115 A1 1/2017 Tachibana et al.
2017/0025128 A1* 1/2017 Blesser ................. G10L 19/018
2017/0025129 A1* 1/2017 Blesser ................. G10L 19/018
2017/0064246 A1 3/2017 Kline et al.
2017/0245106 A1* 8/2017 Connelly .............. H04W 72/51
2017/0279542 A1* 9/2017 Knauer ............... H04L 65/1059
2018/0152796 A1 5/2018 Stone et al.
2018/0242083 A1 8/2018 Lindemann
2018/0374460 A1* 12/2018 Bradley ................... G10H 1/40
2019/0013879 A1* 1/2019 Webster ................. H04B 11/00
2019/0082224 A1 3/2019 Bradley et al.
2019/0121532 A1 4/2019 Strader et al.
2019/0122691 A1 4/2019 Roy et al.
2019/0122766 A1 4/2019 Strader et al.
2019/0155997 A1 5/2019 Vos et al.
2019/0200071 A1* 6/2019 Knauer .............. H04N 21/4126
2019/0281354 A1 9/2019 Webster et al.
2019/0333486 A1* 10/2019 Bradley ................... G10H 1/40
2020/0051534 A1* 2/2020 Bradley ................... G10H 1/40
2020/0077184 A1 3/2020 Mizuno
2020/0082816 A1 3/2020 Mahajan
2020/0286086 A1 9/2020 Chanduri et al.
2021/0082380 A1* 3/2021 Bradley ............... G10H 1/0008
2021/0160570 A1 5/2021 Webster
2021/0264887 A1* 8/2021 Bradley ................... G10H 1/40
2021/0377335 A1* 12/2021 McWilliams ........... G06F 9/542
2021/0398031 A1 12/2021 Webster
2021/0406855 A1 12/2021 Webster

FOREIGN PATENT DOCUMENTS

CN 107005256 A * 8/2017 ............. H04B 11/00
WO WO-0018054 A2 * 3/2000 ........... G11B 27/032
WO WO-0161987 A2 * 8/2001 ............... G06F 7/00

* cited by examiner

ENHANCED SYSTEM, METHOD, AND DEVICES FOR CAPTURING INAUDIBLE TONES ASSOCIATED WITH CONTENT

PRIORITY

This application claims priority to U.S. Provisional Patent Application Ser. No. 62/524,835 entitled ENHANCED SYSTEM, METHOD, AND DEVICES FOR UTILIZING INAUDIBLE TONES WITH MUSIC filed on Jun. 26, 2017 and is a continuation of U.S. Utility patent application Ser. No. 16/019,257 entitled ENHANCED SYSTEM, METHOD, AND DEVICES FOR UTILIZING INAUDIBLE TONES WITH MUSIC filed on Jun. 26, 2018, and U.S. Utility patent application Ser. No. 16/506,670 entitled ENHANCED SYSTEM, METHOD, AN DEVICES FOR CAPTURING INAUDIBLE TONES ASSOCIATED WITH MUSIC filed on Jul. 9, 2019, the entirety of each are incorporated by reference herein.

BACKGROUND

I. Field of the Disclosure

The illustrative embodiments relate to music. More specifically, but not exclusively, the illustrative embodiments relate to enhancing music through associating available information.

II. Description of the Art

Teaching, learning, and playing music may be very challenging for individuals. It may be even more difficult for students and others with limited exposure to music notes, theory, or instruments. Unfortunately, music advancement has not kept pace with advancements in technology and resources to create, teach, learn, and play music more easily and increase accessibility for individuals of all skill levels, cognition, and abilities.

SUMMARY OF THE DISCLOSURE

The illustrative embodiments provide a system, method, and device for capturing inaudible tones from content. Content is received. Inaudible tones in the content are detected. Information associated with the inaudible tones of the content is extracted. Information associated with the inaudible tones is communicated to one or more devices. One or more actions associated with the information extracted from the inaudible tones is automatically implemented utilizing the one or more devices. Another embodiment provides a device including a processor for executing a set of instructions and a memory for storing the set of instructions. The set of instructions are executed to perform the method(s) herein described.

Another embodiment provides a method for communicating inaudible tones. Content is received. Inaudible tones in the content are detected. Information associated with the inaudible tones of the content is extracted. Information associated with the inaudible tones is communicated to one or more devices. Another embodiment provides a device including a processor for executing a set of instructions and a memory for storing the set of instructions. The set of instructions are executed to perform the method(s) herein described.

Yet another embodiment provides a system for utilizing inaudible tones in content. The system includes a transmitting device configured to broadcast content including one or more inaudible tones. The system further includes a receiving device that receives the content, detects inaudible tones in the content, extracts information associated with the inaudible tones of the content, communicates the information associated with the inaudible tones to a user through one or more devices including at least the receiving device, and automatically implements one or more actions associated with the information extracted from inaudible tones utilizing the one or more devices.

The illustrative embodiments provide a system, method, and device for capturing inaudible tones from music. A song is received. Inaudible tones are detected in the song. Information associated with the inaudible tones is extracted from the song. The information associated with the inaudible tones is communicated to a user. Another embodiment provides a device including a processor for executing a set of instructions and a memory for storing the set of instructions. The set of instructions are executed to perform the method(s) herein described.

Another embodiment provides a method for utilizing the inaudible tones with music. Music is received utilizing an electronic device including at least a display. Inaudible tones in the music are detected. Information associated with the inaudible tones of the music is extracted. The information associated with the inaudible tones is communicated to a user utilizing at least the display of the electronic device.

Yet another embodiment provides a system for utilizing inaudible tones in music. A transmitting device is configured to broadcast music including one or more inaudible tones. A receiving devices receives the music, detects inaudible tones in the music, extracts information associated with the inaudible tones of the music, and communicates information associated with the inaudible tones to a user through the receiving device, wherein the information includes at least notes associated with the music.

Yet another illustrative embodiment provides a system, method, and device for utilizing inaudible tones for music. A song is initiated with enhanced features. A determination is made whether inaudible tones including information or data are associated with a portion of the song. The associated inaudible tone is played. Playback of the song is continued. Another embodiments provides a device including a processor for executing a set of instructions and a memory for storing the set of instructions. The instructions are executed to perform the method described above.

Yet another embodiment provides a method for utilizing inaudible tones for music. Music and inaudible tones associated with the music are receiving utilizing an electronic device including at least a display. Information associated with the inaudible tones is extracted. The information associated with the inaudible tones is communicated. Another embodiments provides a receiving device including a processor for executing a set of instructions and a memory for storing the set of instructions. The instructions are executed to perform the method described above.

Yet another embodiment provides a system for utilizing inaudible tones in music. The system includes a transmitting device that broadcasts music synchronized with one or more inaudible tones. The system includes a receiving device that receives the inaudible tones, extracts information associated with the inaudible tones, and communicates the information associated with the inaudible tones.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

The illustrative embodiments provide a system and method for utilizing inaudible tones integration with visual sheet music, inaudible time codes, musical piece displays, live music capture, execution, and marking, and musical accompaniment suggestions. The illustrative embodiments may be implemented utilizing any number of musical instruments, wireless devices, computing devices, or so forth. For example, an electronic piano may communicate with a smart phone to perform the processes and embodiments herein described. The illustrative embodiments may be utilized to create, learn, play, observe, or teach music.

The illustrative embodiments may utilize inaudible tones to communicate music information, such as notes being played. A visual and text representation of the note, notes, or chords may be communicated. The illustrative embodiments may be utilized for recorded or live music or any combination thereof. The inaudible tones may be received and processed by any number of devices to display or communicate applicable information.

Figure 1:
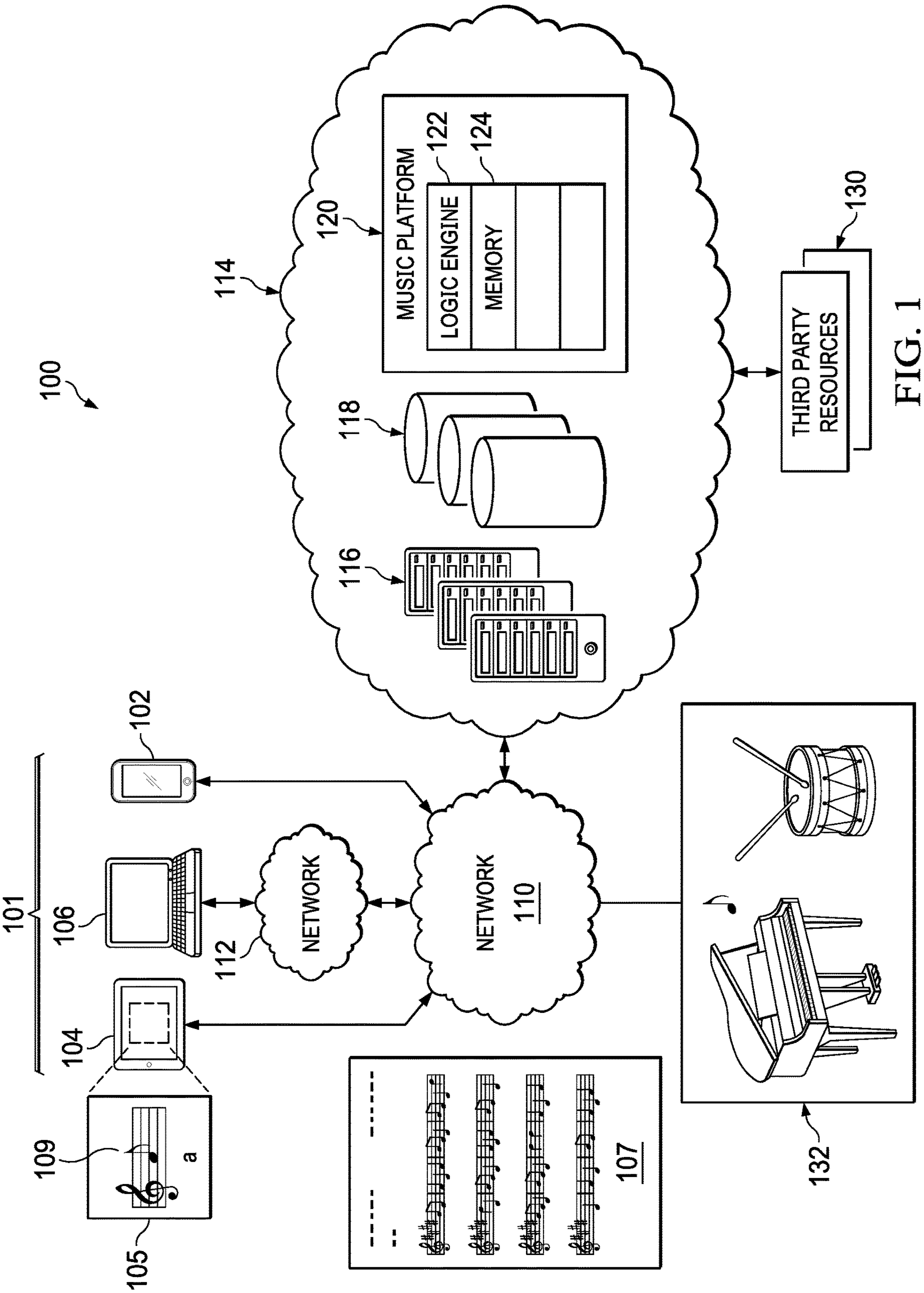
FIG. 1 is a pictorial representation of a system for utilizing inaudible tones in accordance with an illustrative embodiment.

FIG. 1 is a pictorial representation of a system 100 for utilizing inaudible tones in accordance with an illustrative embodiment. In one embodiment, the system 100 of FIG. 1 may include any number of devices 101, networks, components, software, hardware, and so forth. In one example, the system 100 may include a wireless device 102, a tablet 104 utilizing a graphical user interface 105, a laptop 106 (altogether devices 101), a network 110, a network 112, a cloud network 114, servers 116, databases 118, and a music platform 120 including at least a logic engine 122, and memory 224. The cloud network 114 may further communicate with third-party resources 130.

In one embodiment, the system 100 may be utilized by any number of users to learn, play, teach, observe, or review music. For example, the system 100 may be utilized with musical instruments 132. The musical instruments 132 may represent any number of acoustic, electronic, networked, percussion, wind, string, or other instruments of any type. In one embodiment, the wireless device 12, tablet 104, or laptop 106 may be utilized to display information to a user, receiver user input, feedback, commands, and/or instructions, record music, store data and information, play inaudible tones associated with music, and so forth.

The system 100 may be utilized by one or more users at a time. In on embodiment, an entire band, class, orchestra, or so forth may utilize the system 100 at one time utilizing their own electronic devices or assigned or otherwise provided devices. The devices 101 may communicate utilizing one or more of the networks 110, 112 and the cloud network 114 to synchronize playback, inaudible tones, and the playback process. In one embodiment, software operated by the devices of the system 100 may synchronize the playback and learning process. For example, mobile applications executed by the devices 101 may perform synchronization, communications, displays, and the processes herein described. The devices 101 may play inaudible tones as well as detect music, tones, inaudible tones, and input received from the instruments 132.

The inaudible tones discussed in the illustrative embodiments may be produced from the known tone spectrum in an audio range that is undetectable to human ears. The inaudible tone range is used to carry data transmissions to implement processes, perform synchronization, communicate/display information, and so forth. Any number of standard or specialized devices may perform data recognition, decoding, encoding, transmission, and differentiation via the inaudible tone data embedded in the inaudible tones.

The inaudible tones may be combined in various inaudible tone ranges that are undetectable to human ears. The known human tone range of detection can vary from 20 Hz to 20,000 Hz. The illustrative embodiments utilize the inaudible tone spectrum in the ranges of 18 Hz to 20 Hz and 8 KHz to 22 KHz, which both fall under the category of inaudible frequencies. The inaudible tones at 8 kHz, 10 kHz, 12 kHz, 14 kHz, 15 kHz, 16 kHz, 17 kHz, 17.4 kHz, 18 kHz, 19 kHz, 20 kHz, 21 kHz, and 22 kHz may be particularly useful. The illustrative embodiments may also utilize Alpha and Beta tones which use varied rates of inaudible tone frequency modulation and sequencing to ensure a broader range of the inaudible tone frequency spectrum is available from each singular inaudible tone range. The illustrative embodiments may also utilize audible tones to perform the processes, steps, and methods herein described.

The inaudible tones carry data that is processed and decoded via microphones, receivers, sensors, or tone processors. The microphones and logic that perform inaudible tone processing be pre-installed on a single purpose listening device or installed in application format on any standard fixed or mobile device with a built-in microphone and processor. The inaudible tones include broadcast data from various chips or tone transmission beacons, which are recognized and decoded at the microphone and logic.

The devices 101 are equipped to detect and decode data contained in the inaudible signals sent from any number of other sources. The devices 101 as well as the associated inaudible tone applications or features be programmed in an always on, passive listening, scheduled listening mode or based on environmental conditions, location (e.g., school, classroom, field, venue, etc.), or other conditions, settings, and/or parameters. In one embodiment, the music-based data and information may also be associated with the inaudible tones so that it does not have to be encoded or decoded.

The devices 101 may be portable or fixed to a location (e.g., teaching equipment for a classroom). In one embodiment, the devices 101 may be programmed to only decode tones and data specific to each system utilization. The devices 101 may also be equipped to listen for the presence or absence of specific tones and recognize the presence of each specific tone throughout a location or environment. The devices 101 may also be utilized to grant, limit or deny access to the system or system data based on the specific tone.

In one embodiment, the inaudible tones associated with a particular piece of music, data, or information may be stored in the memories of the devices 101 of the system 100, in the databases 118, or the memory 124 of the music platform 120 or in other memories, storage, hardware, or software. Similarly, the devices 101 of the system 100 may execute software that coordinates the processes of the system 100 as well as the playback of the inaudible tones.

In one embodiment, cloud network 114 or the music platform 120 may coordinate the methods and processes described herein as well as software synchronization, communication, and processes. The software may utilize any number of speakers, microphones, tactile components (e.g., vibration components, etc.) graphical user interfaces, such as the graphical user interface 105 to communicate and receive indicators, inaudible tones, and so forth.

The system 100 and devices may utilize speakers and microphones as inaudible tone generators and inaudible tone receivers to link music 107, such as sheet music notation or tablature-based notes to the tempo of a song creating a visual musical score. The process utilizes sound analysis tools on live and pre-produced musical pieces 107 or may be used with other tablature, standard sheet music, and sheet music creation tools (music 107).

The inaudible tone recognition tool ties sheet music 107 to the actual audio version of a song and in real-time to visually broadcasts each note 109 (notes, chord) that each instrument or voice produced during the progression of a song and visually displays the note in conjunction with the rhythm of the song through an inaudible tone. The note 109 may represent a single note, multiple notes, groups or sets of notes, or a chord. As shown, the note 109 may be displayed by the graphical user interface 105 by an application executed by the wireless device 104. The note 109 may be displayed graphically as a music node as well as the associated text or description, such as "a". The note 109 may also indicate other information, such as treble clef or bass clef.

In another embodiment, primary or key notes 109 of the music 107 may be displayed to the devices 101 based on information from the inaudible tones. Alternatively, a user (e.g., teacher, student, administrator, etc.) may select preselect or indicate in real-time the notes 109 from the music 107 to be displayed. The note 109 may be displayed individually or as part of the music 105. For example, the note 109 may light up, move, shake, or be otherwise be animated when played.

As noted, any number of devices 101 may be utilized to display the associated music 105, notes 109, and content. In addition, one of the devices 101 may coordinate the display and playback of information, such as a cell phone, table, server, personal computer, gaming device, or so forth.

Any number of flags, instructions, codes, inaudible tones, or other indicators may be associated with the notes 109, information, instructions, commands, or data associated with the music 107. As a result, the indicators may show the portion of the music being played. The indicators may also provide instructions or commands or be utilized to automatically implement an action, program, script, activity, prompt, display message, or so forth. The indicators may also include inaudible codes that may be embedded within music to perform any number of features or functions.

Inaudible time codes are placed within the piece of music 107 indicating the title and artist, the availability of related sheet music for the song, the start and finish of each measure, the vocal and instrumental notes or song tablature for each measure, and the timing and tempo fluctuations within a measure. The system 100 may also visually pre-indicate when a specific instrument or groups of instruments will enter in on the piece of music 107. Through the utilization of inaudible time codes embedded in the song and its measures the system can adjust the notes to the tempo and rhythm of music 107 that has numerous or varied tempo changes.

Multiple different inaudible tones may be associated with the different information outlined herein. The inaudible tones may facilitate teaching, learning, playing, or otherwise being involved with music playing, practice, or theory. For example, the inaudible tones may be embedded in the soundtrack of a broadcast. The inaudible tones may be delivered through any number of transmissions utilizing digital or analog communications standards, protocols, or signals. For example, the inaudible tones may represent markers resulting in the ability to play back and display sheet music notes 109 on time and synchronized with the music.

The music 107 or song data may include artist, title, song notes, tablature, and other information for a specific piece of music are transmitted from the song data contained in the inaudible tones via a network broadcast, wireless signal, satellite signal, terrestrial signal, direction connection, peer-to-peer connection, software based communication, via a music player, to a device, mobile device, wearable, e-display, electronic equalizer, holographic display, projected, or streamed to a digital sheet music stand or other implementation that visually displays the notes 109 and tempo that each specific instrument will play.

Through the user interface 106, a digital display, or visually projected musical representation each instrument and its associated notes 109 may be displayed in unison as the piece of music 107 plays. In one embodiment, each instrument in a musical piece 107 may be is assigned a color indicator or other visual representations. The display may also be selectively activated to highlight specific instrumental musical pieces. The instrument and representative color is visually displayed in a musical staff in standard musical notation format or in single or grouped notes 109 format that represent one or a chorded group of the 12 known musical notes A-G# or may be visually displayed as a standard tablature line that that displays the musical notes 109 in a number-based tablature format.

In one embodiment, one of the devices 101 may be a car radio. The car radio may display the notes 109 of the music 107. The system 100 may be effective in communicating the inaudible tones to any device within range to receive the inaudible tones. For example, the range of the inaudible tones may be only be limited by the acoustic and communications properties of the environment.

Live Music Capture, Execution, and Marking: In one embodiment, the system 100 utilizes a software-based sound capture process that is compatible with the devices 101 used to capture the inaudible tone song data. The devices 101 may capture the inaudible tone song data and in real-time capture, produce and analyze a real-time progression of the actual visual musical piece 107 in conjunction with the piece 107 being played by a live band, live orchestra, live ensemble performance, or other live music environment. The sound capture devices 101 that capture the inaudible song data may also capture each live instrumental note as it is played by a single instrument or group of performers' and is indicated with a visual representation that indicates a played note 105 is on time with the software based internal metronome marking the time in a musical piece 107.

The system 100 may indicate if each note 105 is played correctly which displays the note 105 in green as a correctly executed note, or if the note 105 is off beat or incorrect the note 109 displays red on the metronome tick as an incorrectly executed note, the metronome may also indicate if a specific instruments note was played too fast or too slow. The system 100 may also generate a report for each instrument and each instrumentalist's overall success rate for each note, timing, and other performance characteristics as played in a musical score. The report may be saved or distributed as needed or authorized.

Musical Accompaniment Suggestions: The system 100 may also make rhythmic or tempo based suggestions in addition to suggest new musical accompaniment that isn't included or heard in the original music piece 107. For example, the suggestions may be utilized to teach individuals how to perform improvisation and accompaniment. The system 100 may group specific instruments and may also indicate where other instruments may be added to fit into a piece of music 107. The system 100 may also make recommendations where new musical instrumental elements might fit into an existing piece of music 107. This also includes suggested instrumental or vocal elements, computer generated sounds, or other musical samples. The system 100 may indicate where groups of instruments share the same notes and rhythm pattern in the music 107. The system 100 may allow conductors or music composers to create and modify music 107 in real-time as it is being played or created.

Figure 2:
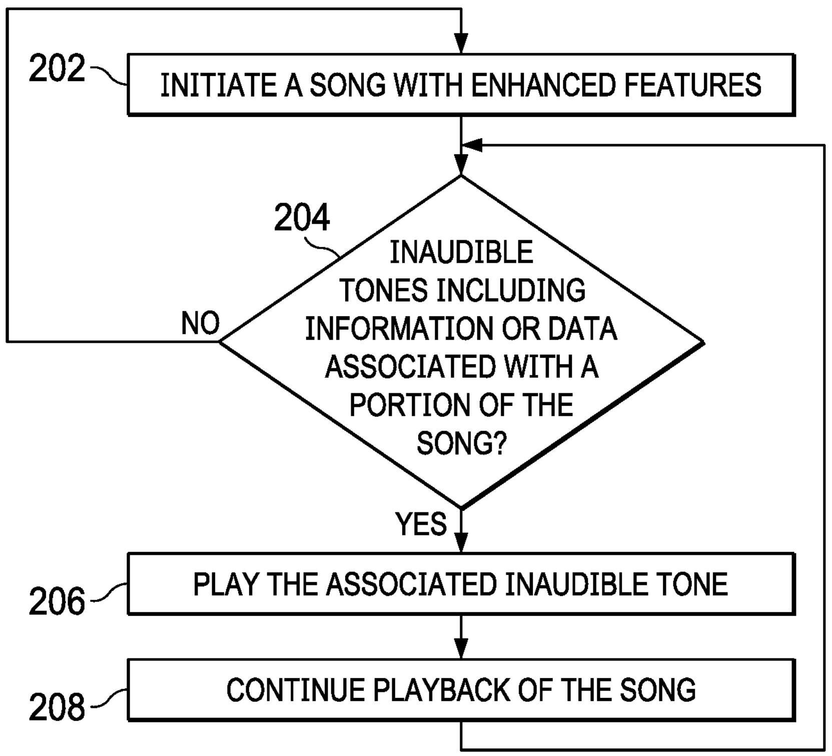
FIG. 2 is a flowchart of a process for utilizing inaudible tones in accordance with an illustrative embodiment.

FIG. 2 is a flowchart of a process for utilizing inaudible tones in accordance with an illustrative embodiment. In one embodiment, a song may represent electronic sheet music, songs, teaching aids, digital music content, or any type of musical content. The process of FIG. 2 may be performed by an electronic device, system, or component. For example, a personal computer (e.g., desktop, laptop, tablet, etc.), wireless device, DJ system, or other device may be utilized. The process of FIG. 2 may begin by initiating a song with enhanced features (202). The song may be initiated for audio or visual playback, display, communication, review, teaching, projection, or so forth. In one example, the song may be initiated to teach an orchestral group of a middle school the song. The song may include a number of parts, notes, and musical combinations for each of the different participants. The song may also represent a song played for recreation by a user travelling in a vehicle (e.g., car, train, plane, boat, etc.).

Next, the device determines whether there are inaudible tones including information or data associated with a portion of the song (step 204). Step 204 may be performed repeatedly for different portions or parts of the song corresponding to lines, measures, notes, flats, bars, transitions, verse, chorus, bridge, intro, scale, coda, notations, lyrics, melody, solo, and so forth. In one embodiment, each different portion of the song may be associated with inaudible information and data.

Next, the device plays the associated inaudible tone (step 206). The inaudible tone may be communicated through any number of speakers, transmitters, emitters, or other output devices of the device or in communication with the device. In one embodiment, the inaudible tone is simultaneously broadcast as part of the song. The inaudible tones represent a portion of the song that is unhearable by the listeners.

Next, the device continues playback of the song (step 208). Playback is continued until the song has been completed, the user selects to end the process, or so forth. In one embodiment, during step 208, the device may move from one portion of the song to the next portion of the song (e.g., moving from a first note to a second note). As noted, the playback may include real-time or recorded content. In one example, the content is a song played by a band at a concert. In another example, the content may represent a classical orchestral piece played from a digital file.

Next, the device returns again to determine whether there is inaudible information or data associated with a portion of the song (step 204). As noted, the process of FIG. 2 is performed repeatedly until the song is completed.

Figure 3:
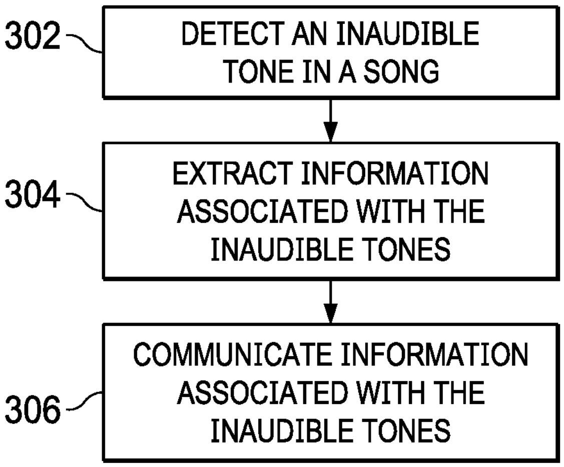
FIG. 3 is a flowchart of a process for processing inaudible tones in accordance with an illustrative embodiment.

FIG. 3 is a flowchart of a process for processing inaudible tones in accordance with an illustrative embodiment. The process of FIG. 3 may be performed by any number of receiving devices. In one embodiment, the process may begin by detecting an inaudible tone in a song (step 302). The number and types of devices that may detect the inaudible tones is broad and diverse. The devices may be utilized for learning, teaching, entertainment, collaboration, development, or so forth.

Next, the device extracts information associated with the inaudible tones (step 304). The data and information may be encoded in the inaudible tones in any number of analog or digital packets, protocols, formats, or signals (e.g., data encryption standard (DES), triple data encryption standard, Blowfish, RC4, RC2, RC6, advanced encryption standard). Any number of ultrasonic frequencies and modulation/demodulation may be utilized for data decoding, such as chirp technology. The device may utilize any number of decryption schemes, processes, or so forth. The information may be decoded as the song is played. As previously noted, the information may be synchronized with the playback of the song. In some embodiments, network, processing, and other delays may be factored in to retrieve the information in a timely manner for synchronization. For example, the inaudible tones may be sent slightly before a note is actually played so that step 306 is being performed as the associated note is played.

Next, the device communicates information associated with the inaudible tones (step 306). In one embodiment, the device may display each note/chord of the song as it is played. For example, a zoomed visual view of the note and the text description may be provided (e.g., see for example note 109 of FIG. 1). The information may also be displayed utilizing tactile input, graphics, or other content that facilitate learning, understanding, and visualization of the song. The communication of the information may help people learn and understand notes, tempo, and other information associated with the song. During step 306, the device may also perform any number of actions associated with the inaudible tones.

In one embodiment, the device may share the information with any number of other devices proximate the device. For example, the information may be shared through a direct connection, network, or so forth.

Figure 4:
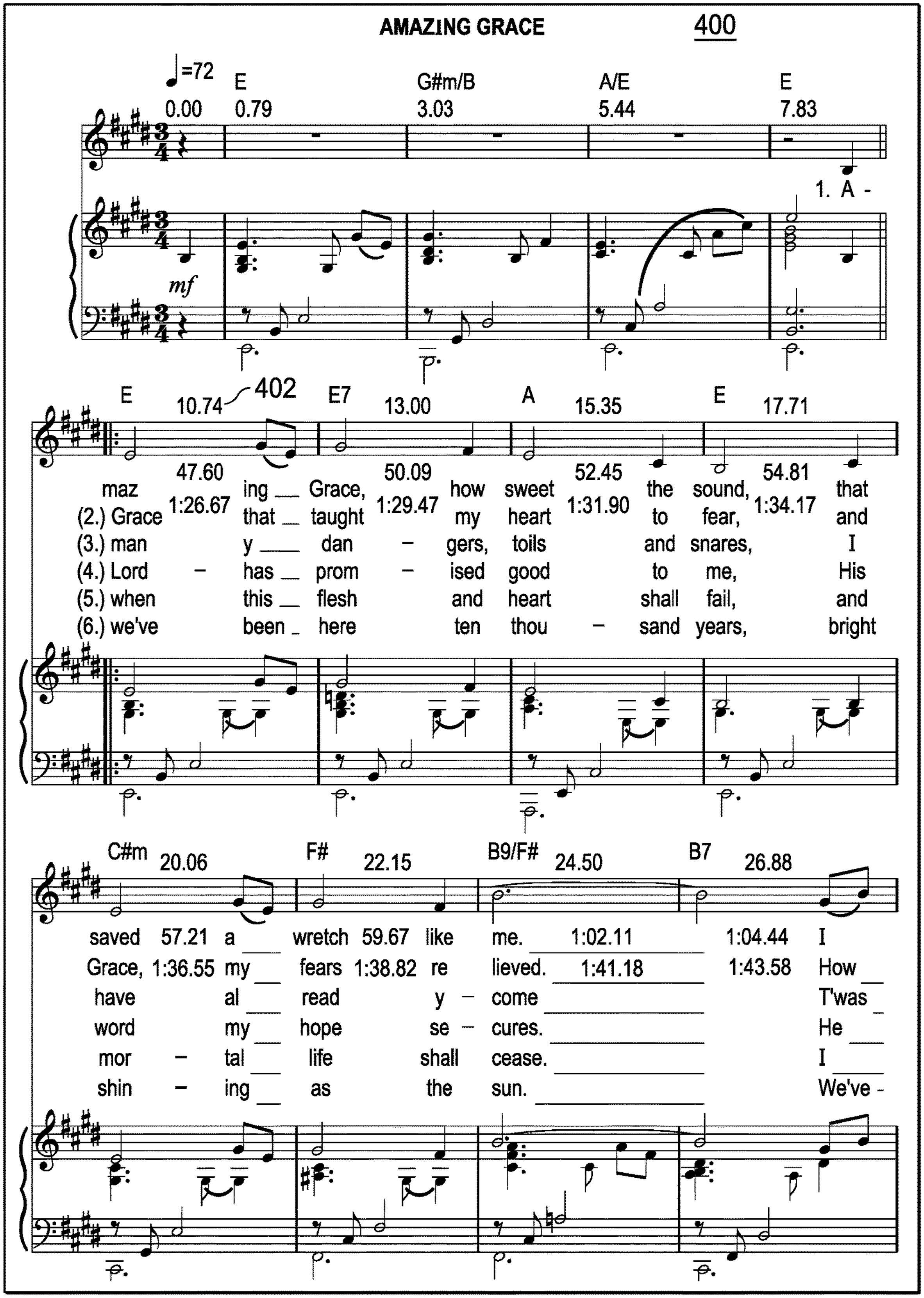
FIGS. 4 and 5 are a first embodiment of sheet music including notations for utilizing a system in accordance with illustrative embodiments.
Figure 5:
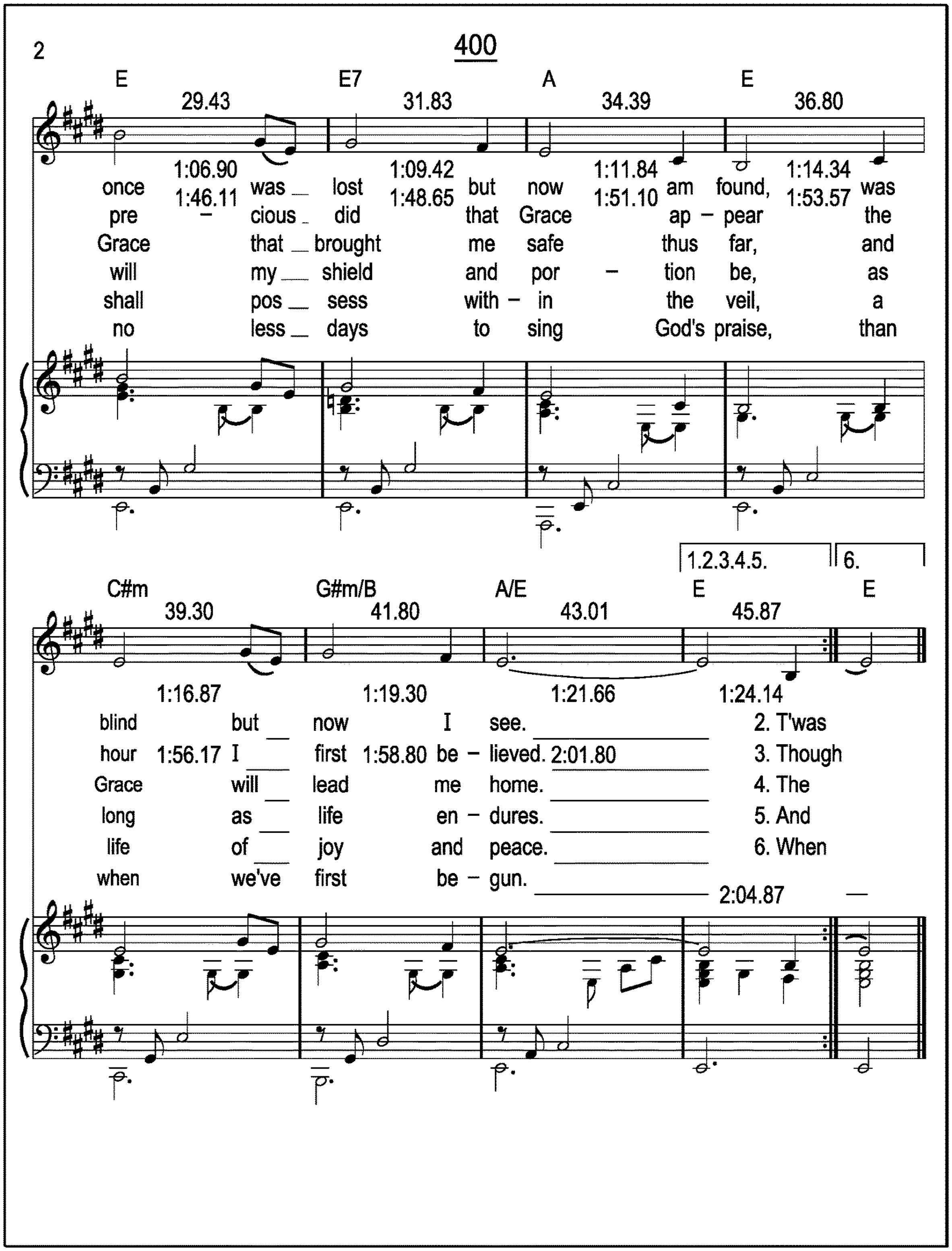
Figure 6:
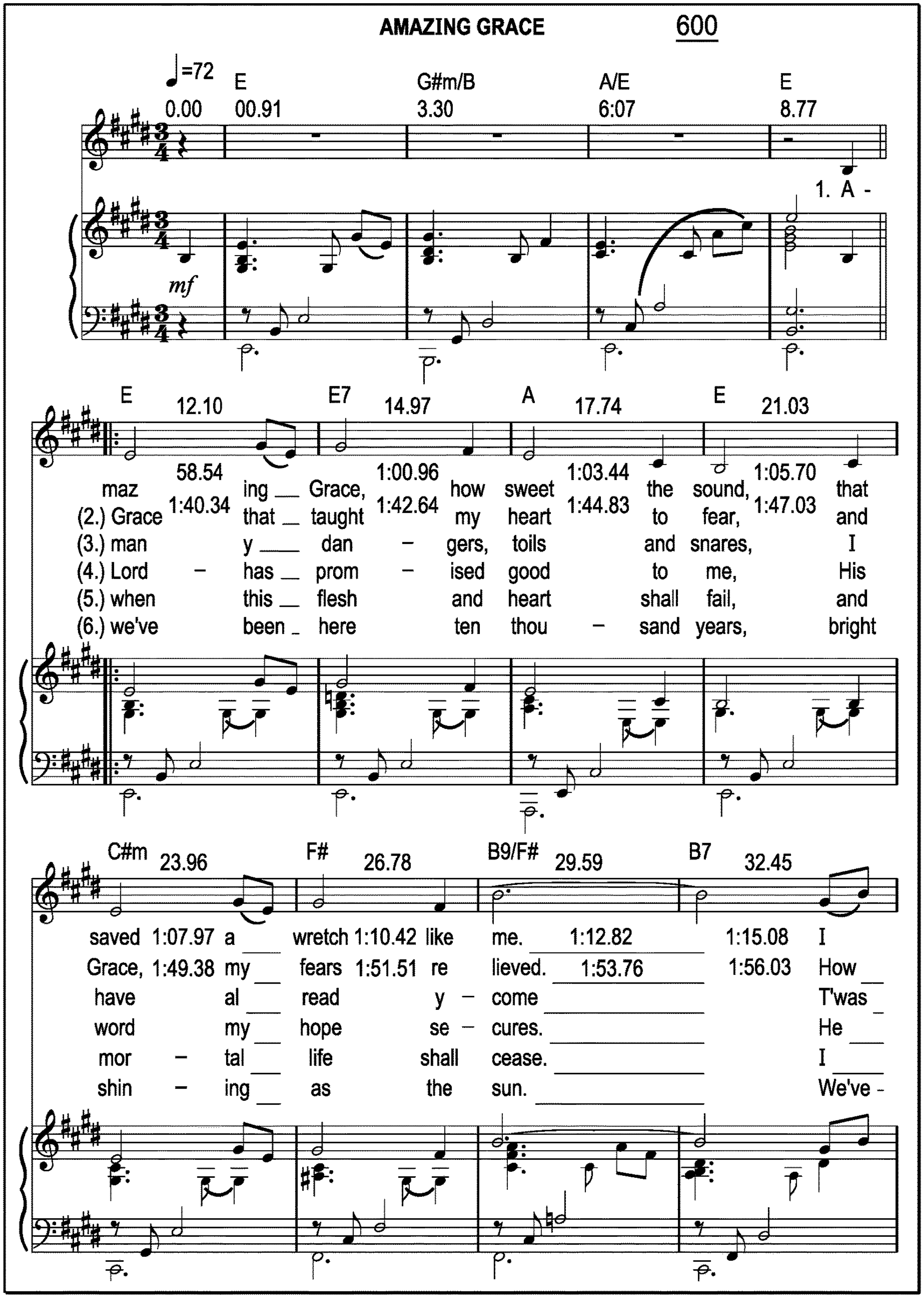
FIGS. 6 and 7 are a second embodiment of sheet music including notations for utilizing an inaudible system in accordance with illustrative embodiments.
Figure 7:
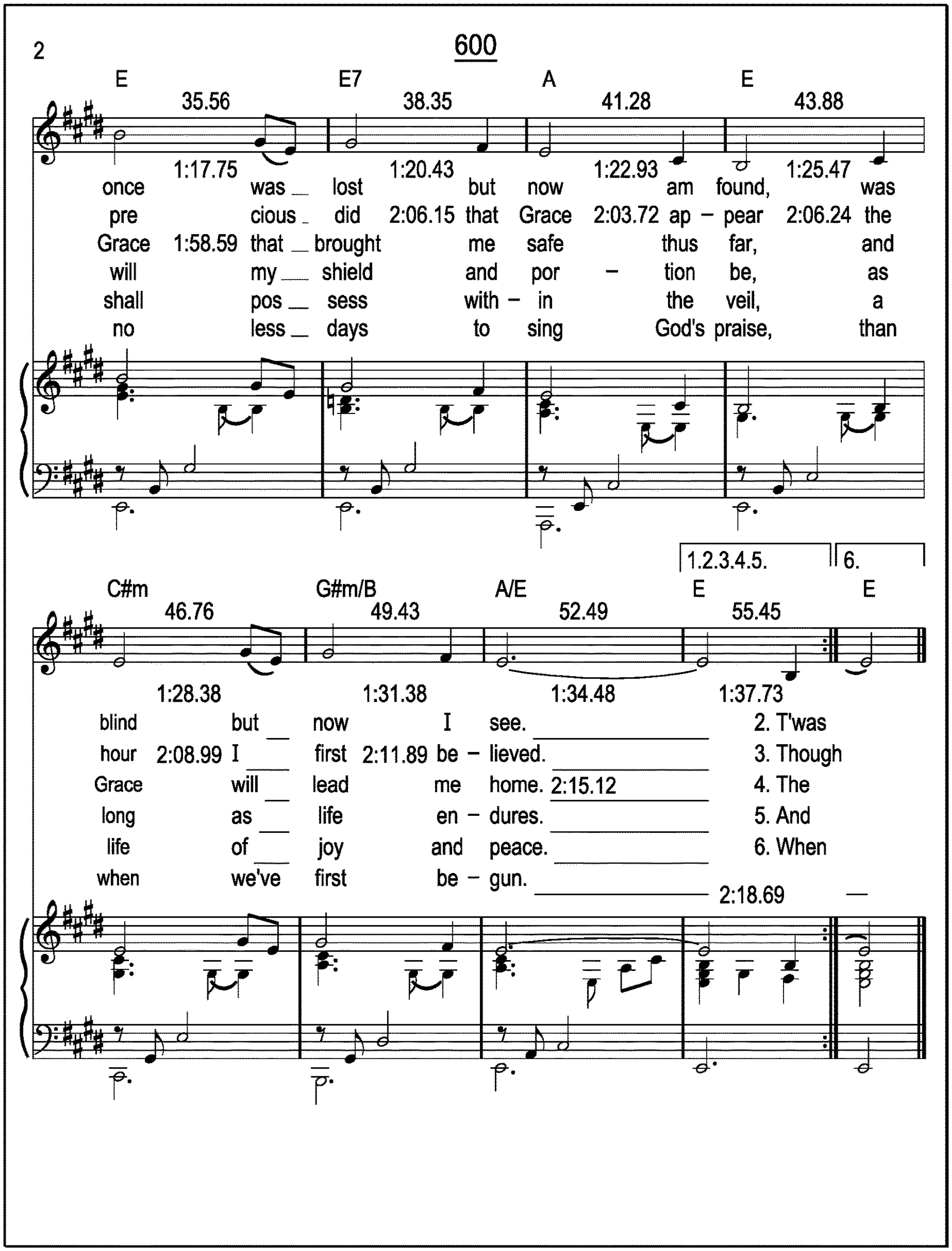

FIGS. 4 and 5 are a first embodiment of sheet music 400 including notations for utilizing a system in accordance with illustrative embodiments. FIGS. 6 and 7 are a second embodiment of sheet music 600 including notations for utilizing an inaudible system in accordance with illustrative embodiments. The embodiments shown in FIGS. 4-7 represent various versions of Amazing Grace. In one embodiment, time codes 402 of the measures (bars) and tempo show how the illustrative embodiments utilize indicators to display music. In one embodiment, the indicators may each be associated with inaudible tones. For example, at time code 10.74 the inaudible tone may communicate content to display the note "e" visually as well as textually. As shown by the time codes 402 any number of note/chord combinations may also be displayed. In addition, the time codes 402 may be applicable to different verses of the song.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wireless personal area network (WPAN), or a wide area network (WAN), or the connection may be made to an external computer (e.g., through the Internet using an Internet Service Provider).

Figure 8:
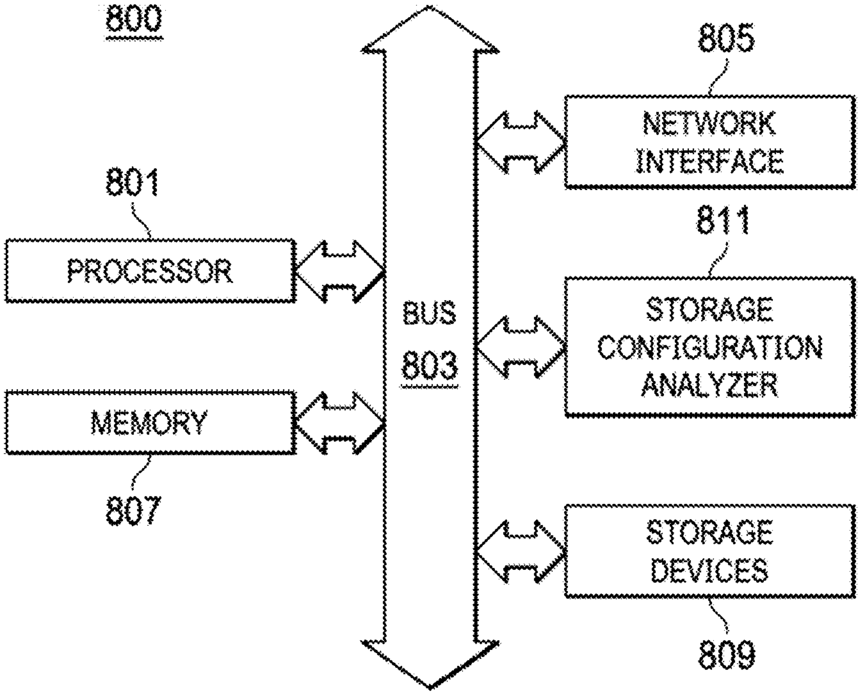
FIG. 8 depicts a computing system in accordance with an illustrative embodiment.

FIG. 8 depicts a computing system 800 in accordance with an illustrative embodiment. For example, the computing system 800 may represent a device, such as the wireless device 102 of FIG. 1. The computing system 800 includes a processor unit 801 (possibly including multiple processors, multiple cores, multiple nodes, and/or implementing multi-threading, etc.). The computing system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), a storage configuration analyzer 811, and a storage device(s) 809 (e.g., optical storage, magnetic storage, etc.).

The system memory 807 embodies functionality to implement all or portions of the embodiments described above. The system memory 807 may include one or more applications or sets of instructions for implementing a communications engine to communicate with one or more electronic devices or networks. The communications engine may be stored in the system memory 807 and executed by the processor unit 802. As noted, the communications engine may be similar or distinct from a communications engine utilized by the electronic devices (e.g., a personal area communications application). Code may be implemented in any of the other devices of the computing system 800. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801. The computing system 800 may further include any number of optical sensors, accelerometers, magnetometers, microphones, gyroscopes, temperature sensors, and so forth for verifying user biometrics, or environmental conditions, such as motion, light, or other events that may be associated with the wireless earpieces or their environment.

The illustrative embodiments are not to be limited to the particular embodiments and examples described herein. In particular, the illustrative embodiments contemplate numerous variations in the type of ways in which embodiments of the invention may be applied to music teaching, playback, and communication utilizing inaudible tones. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments disclosed with greater particularity.

What is claimed is:

1. A method for utilizing inaudible tones from content, comprising:

receiving the content in a wireless audio signal, content of the wireless audio signal including at least an audible portion and the inaudible tones;

detecting the inaudible tones in the content of the wireless audio signal including the audible portion, each of the inaudible tones having a frequency which is inaudible to humans;

extracting information associated with the inaudible tones of the content from the wireless audio signal;

communicating the information associated with the inaudible tones to one or more devices;

automatically implementing one or more actions associated with the information extracted from the inaudible tones of the wireless audio signal utilizing the one or more devices.

2. The method of claim 1, wherein the content is received through a microphone of an electronic device.

3. The method of claim 1, wherein the content is music with enhanced features including at least the inaudible tones, and wherein the inaudible tones are sounds frequencies that are not discernable by humans.

4. The method of claim 1, wherein communicating the information includes displaying lyrics associated with the song as played.

5. The method of claim 1, wherein the content represents live content or recorded content.

6. The method of claim 1, wherein the detecting is performed utilizing one or more decryption processes.

7. The method of claim 1, wherein an electronic device executes an application for detecting the inaudible tones.

8. The method of claim 1, wherein the information includes tablature associated with the content.

9. The method of claim 1, wherein the inaudible tones are associated with a portion of the content.

10. The method of claim 1, wherein the information includes each instrument, voice, and note associated with the content.

11. The method of claim 1, wherein automatically implementing one or more actions includes implementing a program on the one or more devices.

12. The method of claim 1, wherein a plurality of different portions of the content are each associated with a plurality of inaudible tones and associated information.

13. The method of claim 1, wherein communicating further comprises:

visually displaying the information associated with the content to the one or more devices, wherein the information is communicated as a corresponding portion of the content is played.

14. A method for communicating inaudible tones, comprising:

receiving content in a wireless audio signal utilizing an electronic device including at least a display, content of the wireless audio signal includes at least an audible portion and the inaudible tones;

detecting inaudible tones in the content of the wireless audio signal, each of the inaudible tones having a frequency which is inaudible to humans, the wireless audio signal including at least an audible portion and the inaudible tones;

extracting information associated with the inaudible tones of the content from the wireless audio signal; and communicating the information associated with the inaudible tones to one or more electronic devices including at least the electronic device.

15. The method of claim 14, wherein the inaudible tones are audio frequencies that are not discernable by humans, wherein the inaudible tones are embedded in the content.

16. The method of claim 14, further comprising:

implementing one or more actions associated with the information extracted from inaudible tones of the wireless audio signal utilizing the electronic device.

17. The method of claim 14, wherein the information includes one or more of notes, tablatures, measures, and instructions.

18. A system for utilizing inaudible tones in content, comprising:

a transmitting device configured to broadcast content including one or more inaudible tones in a wireless audio signal, the content including at least an audible portion and the inaudible tones;

a receiving device that receives the content in the wireless audio signal, detects inaudible tones in the content of the wireless audio signal, extracts information associated with the inaudible tones of the content from the wireless audio signal, communicates the information associated with the inaudible tones to a user through one or more devices including at least the receiving device, and automatically implements one or more actions associated with the information extracted from inaudible tones of the wireless audio signal utilizing the one or more devices, wherein each of the one or more inaudible tones have a frequency such that each of the one or more inaudible tones are tones inaudible to humans.

19. The system of claim 18, wherein the transmitting device utilizes one or more speakers to broadcast the content and the inaudible tones, wherein the receiving device utilizes one or more microphones or sensors to receive the inaudible tones, and wherein the inaudible tones are audio frequencies that are not discernable by humans.

20. The system of claim 18, wherein the inaudible tones are received from the transmitting device by a plurality of receiving devices including at least the receiving device.

* * * * *